United States Patent
Benczur-Uermoessy

(10) Patent No.: US 7,205,065 B1
(45) Date of Patent: Apr. 17, 2007

(54) GASTIGHT PRISMATIC NICKEL-METAL HYDRIDE CELL

(75) Inventor: Gabor Benczur-Uermoessy, Stuttgart (DE)

(73) Assignee: Deutsche Automobilgesellschaft mbH, Braunschweig (DE)

(*) Notice: Subject to any disclaimer, the term of this patent is extended or adjusted under 35 U.S.C. 154(b) by 16 days.

(21) Appl. No.: 10/019,488

(22) PCT Filed: Jun. 10, 2000

(86) PCT No.: PCT/EP00/05377

§ 371 (c)(1),
(2), (4) Date: Apr. 29, 2002

(87) PCT Pub. No.: WO01/01509

PCT Pub. Date: Jan. 4, 2001

(51) Int. Cl.
*H01M 10/34* (2006.01)

(52) U.S. Cl. ............................ 429/57; 429/60; 429/223

(58) Field of Classification Search .................. 429/57, 429/59, 60, 137, 223
See application file for complete search history.

(56) References Cited

U.S. PATENT DOCUMENTS

| | | | |
|---|---|---|---|
| 4,115,630 A * | 9/1978 | Van Ommering et al. .... | 429/72 |
| 4,935,318 A * | 6/1990 | Ikoma et al. ................ | 429/206 |
| 5,059,496 A * | 10/1991 | Sindorf ........................ | 429/101 |
| 5,405,719 A * | 4/1995 | Sonoda et al. ............... | 429/223 |
| 5,576,116 A * | 11/1996 | Sanchez et al. .............. | 429/59 |
| 5,658,694 A | 8/1997 | Charkey | |
| 6,103,424 A * | 8/2000 | Hamamatsu et al. ........ | 429/233 |

FOREIGN PATENT DOCUMENTS

| | | |
|---|---|---|
| DE | 2907262 | 9/1980 |
| DE | 3929306 | 3/1991 |
| DE | 4305560 | 8/1994 |
| EP | 0416244 | 7/1990 |
| EP | 419220 A * | 3/1991 |
| EP | 0460424 | 5/1991 |
| EP | 0460425 | 5/1991 |
| EP | 0614238 | 1/1994 |
| EP | 0698937 | 5/1995 |
| JP | 60250567 | 12/1985 |
| JP | 60250567 A * | 12/1985 |
| JP | 01100872 | 4/1989 |
| JP | 06168719 A * | 6/1994 |
| JP | 07235304 A * | 9/1995 |

OTHER PUBLICATIONS

German Office Action.

* cited by examiner

*Primary Examiner*—Gregg Cantelmo
(74) *Attorney, Agent, or Firm*—Crowell & Moring LLP

(57) ABSTRACT

A gastight nickel/metal hydride cell for the storage of electrochemical energy, having at least one positive nickel oxide electrode and at least one hydrogen-storing negative electrode, a hydrophilic separator being arranged between the positive and negative electrodes, and an alkaline electrolyte or an alkaline electrolyte mixture, in that one or more negative electrodes are provided with a gas-permeable, hydrophobic transport element for transporting the gases of the cell atmosphere.

16 Claims, 1 Drawing Sheet

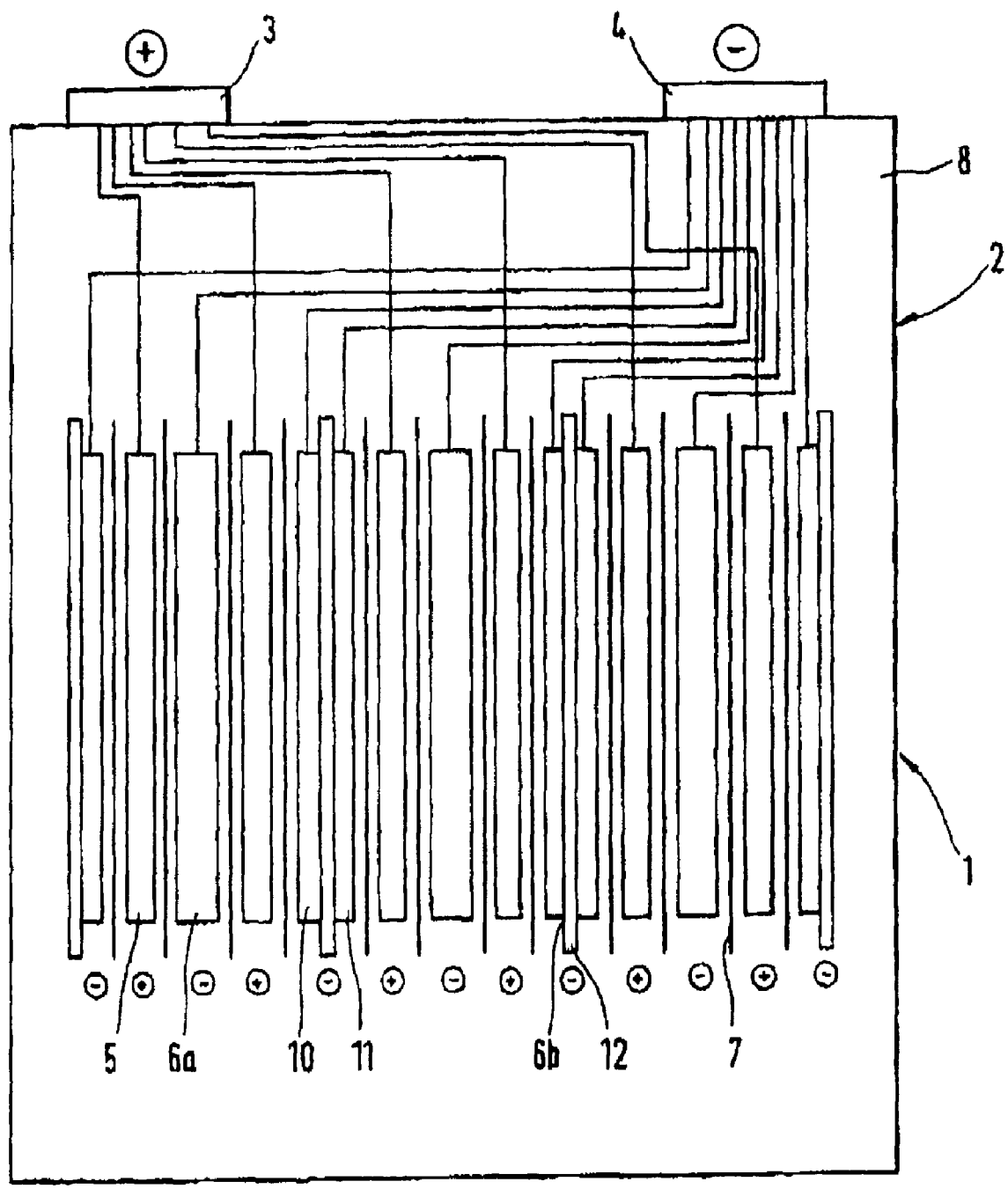

GASTIGHT PRISMATIC NICKEL-METAL HYDRIDE CELL

BACKGROUND AND SUMMARY OF THE INVENTION

This is a national stage application of International Patent Application No. PCT/EP00/05377 filed on Jun. 10, 2000 designating the United States of America, the entire disclosure of which is expressly incorporated by reference herein. Priority is claimed based on Federal Republic of Germany patent application No. 199 29 947.1, filed Jun. 29, 1999.

The invention relates to a gastight cell for the storage of electrochemical energy, having at least one positive nickel oxide electrode and at least one hydrogen-storing negative electrode, a hydrophilic separator being arranged between the positive and negative electrodes, and having an alkaline electrolyte or an alkaline electrolyte mixture.

Storage batteries for storing electrical energy in the form of chemical energy, which can then be removed again as electrical energy, have been known since the end of the nineteenth century. Even today, the lead storage battery is still in widespread use. In such a battery, the electrodes or plates comprise the active material, which is the actual energy store, and a lead support (grid), which holds the active material. There are also batteries with alkaline aqueous electrolytes.

All these galvanic elements substantially comprise the energy-storing electrodes of positive and negative polarity, the electrolyte, the separator between the electrodes, the cell or battery vessel and the current-carrying, connective inactive parts, such as the supply and discharge lines for the current to and from the electrodes. These also include substrate material, current discharge lugs, poles, pole bridges, pole screws, washers and pole connectors.

In a gastight nickel/metal hydride cell, the negative and positive electrodes are arranged alternately next to one another, for example in a prismatic or cuboidal housing, and are separated from one another by a separator. On account of the normally absent freely mobile excess of electrolyte, each of the electrodes is in contact with the cell atmosphere, i.e. the gas space of the cell. The gases which are evolved during charging of the cell pass into this gas space and, in quiescent phases of the cell, react at the negative electrodes. For this purpose, the gases have to diffuse into the electrodes. By way of example, hydrogen is reincorporated in the lattice of the storage alloy of the negative electrode, until an equilibrium state is reached.

Cells of the generic type are described in EP 0 460 424 B1, EP 0 460 425 B1 and DE 39 29 306 C2.

A problem of these cells is that in quiescent phases charge balancing in all the negative electrodes of the cell is not possible, and an excess pressure of hydrogen and oxygen continues to obtain. In fact, auxiliary electrodes or special multilayer electrodes are required for charge balancing.

Therefore, the object of the present invention is to provide a cell of the abovementioned type in which charge balancing is possible in the negative electrodes and the excess pressure is reduced with the minimum possible outlay.

The instant invention provides a cell comprising at least one positive nickel oxide electrode and at least one hydrogen-storing negative electrode, a hydrophilic separator being arranged between the positive and negative electrodes, and an alkaline electrolyte or an alkaline electrolyte mixture, wherein one or more negative electrodes are provided with a gas-permeable, hydrophobic transport element for transporting the gases of the cell atmosphere.

Therefore, according to the invention, one or more negative electrodes are provided with a gas-permeable, hydrophobic transport element for transporting the gases of the cell atmosphere.

The gases of the cell atmosphere, namely hydrogen and oxygen, fill these transport elements and reach the pores in the negative electrodes, which are only partially filled with electrolyte. There, the oxygen is quickly reduced or reacts with the hydrogen, which is present in excess, to form water. The gaseous hydrogen reacts with the storing alloy until thermodynamic equilibrium is reached. In this way, charge balancing is achieved in all the negative electrodes of the cell in quiescent phases, and the excess gas pressure is reduced. It is even possible to reverse the polarity of the cell, since the hydrogen which now evolves at the positive electrode reaches the transport elements and therefore the negative electrodes via the gas phase, and is then oxidized. This sequence of events can be detected by means of a discharge current, e.g. approximately −0.2 V cell voltage, which flows for an unlimited time.

Some advantageous refinements and preferred embodiment of the invention are described below. In the case of cells with high load-bearing capacities and electrode thicknesses of less than 0.5 mm, the outer negative electrodes are preferably flanked by a transport element. Consequently, the balancing operations described above take place relatively slowly.

When using cells with a thicker electrode, it is advantageous if one or more negative electrodes are split into two parts, the two parts being separated from one another by a hydrophobic, gas-permeable transport element. As a result, the balancing operations which have been described above take place relatively quickly.

Preferably, in the sequence of a plurality of positive and negative electrodes, every second negative electrode is split into two parts. The two parts of the split negative electrodes advantageously have half the thickness or half the capacitance of the unsplit negative electrodes.

The transport element is, for example, a hydrophobic nonwoven layer, preferably comprising electrolyte-repelling polypropylene fibers.

The positive electrodes are, for example, nickel oxide electrodes, preferably fibrous-structure framework electrodes, while the negative electrodes are hydrogen-storing electrodes. The separators preferably comprise polyamide fiber nonwoven or hydrophilic polypropylene fiber nonwoven.

Other objects, advantages and novel features of the present invention will become apparent from the following detailed description of the invention when considered in conjunction with the accompanying drawings.

BRIEF DESCRIPTION OF THE DRAWINGS

The sole FIGURE shows a cell according to the present invention.

DETAILED DESCRIPTION OF THE DRAWINGS

A preferred embodiment of the cell according to the invention is diagrammatically depicted in FIG. 1. The cell 1 has a prismatic housing 2 with a positive pole 3 and a negative pole 4. In the housing 2 there are positive nickel oxide electrodes 5 and negative electrodes 6a, 6b comprising a hydrogen-storage alloy, which are in each case separated from one another by a separator 7. All the electrodes are in communication with the gas space 8. Every second negative electrode 6b comprises two half part electrodes 10, 11 which are separated from one another by a gas-permeable transport element 12 in the form of a hydrophobic nonwoven layer.

The negative electrode is preferably equipped with a specifically set hydrophobic/hydrophilic balance. For this purpose, the active compound is obtainable from a paste which is composed of a dry fraction and a liquid fraction. In addition to a hydrogen-storage alloy and polytetrafluoroethylene (PTFE), the dry fraction also contains soot; the liquid fraction contains water and an alcohol with 3–6 C atoms, the particles of the storage alloy being covered with PTFE in the manner of fibrils.

The addition of soot is important to make the mixture easier to process. The addition of soot makes the mixture pasty and able to flow. In the electrode, the soot promotes the electrical contact on a microscale (up to approximately 500 µm), i.e. it spans the distances and provides electrical contact between the openings or pores in the substrate material. These distances or openings, with a size of up to 500 µm, cannot be bridged by the particles in the paste or the active compound which can be obtained therefrom, since they generally have a diameter of only approximately 10 to 100 µm. Furthermore, the soot serves as an oxygen getter for protecting the oxygen-sensitive storage alloy. The PTFE is responsible for the hydrophobic properties of the electrode and enables the three-phase boundary to be set. The reduction of the oxygen and the release and uptake of the hydrogen in the working cell take place in the only partially wetted pores. The PTFE is also responsible for enabling the paste to flow and hold together in the mixing or shaping process. The alcohol is in turn responsible for the temporary wetting of the PTFE powder, since otherwise there would be no distribution through fibrillation in the mixing process.

The method for producing the electrode according to the invention is very simple. The components are mixed in a mixer until a cohesive paste is formed. The paste is shaped and combined with the metallic substrate material (for example expanded metal, fabric, grid, perforated sheet) of the electrode. This is an extraordinarily simple process sequence.

The electrode according to the invention means that it is also no longer necessary to use a PTFE dispersion with a high wetting agent content, which has to be removed by decomposition at elevated temperature (300° C.), damaging the storage alloy, in conventional plastic-bonded storage electrodes.

The dry fraction contains 85–95 parts of the storage alloy, approximately 2–10 parts of soot and 3–8 parts of PTFE. The liquid fraction contains 30–70 parts by volume of water and approximately 70–30 parts by volume of the alcohol. Alcohols with a boiling point of the order of magnitude of approximately 100° C., i.e. for example n-butanol or n-propanol, are particularly suitable.

Furthermore, polyethylene glycol (PEG) may be included in the liquid fraction. The PTFE component means that the finished electrode can only be wetted by lye with extreme difficulty. Therefore, to achieve a sufficient uptake of electrolyte, a polyethylene glycol can be supplied with the make-up water. The proportion of polyethylene glycol is 0.05–0.2% (based on the dry fraction). It is preferable to use a polyethylene glycol with a molecular weight of between $10^5$ and $5 \times 10^6$ g/mol. The alcohol used is preferably n-propanol or n-butanol. Depending on the soot content, the ratio of the dry fraction to the liquid fraction is between 4:1 and 6:1, based on mass.

The electrode according to the invention is preferably used in an alkaline storage battery with positive nickel oxide electrode.

The electrode according to the invention is produced by rolling a dough-like paste onto a structured metal substrate, such as for example an expanded metal or grid mesh. The dough-like paste is prefabricated in a first production step by a mixing and kneading process. The solid and liquid components are mixed in a kneading machine until a cohesive paste is formed, for example in a stable domestic kneading machine. The PTFE particles are fibrillated by the hard compound grains and hold the paste together. The electrode is shaped either by manual rolling or in a rolling train. Either a sheet is produced and is combined with the substrate after drying or the kneaded compound is applied directly to the substrate and is then dried.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. A gastight cell for the storage of electrochemical energy, comprising at least one positive nickel oxide electrode and at least two hydrogen-storing negative electrodes, a hydrophilic separator being arranged between the positive and negative electrodes, with n positive electrodes and (n+1) negative electrodes, the two outmost electrodes being negative electrodes, which are each flanked by a respective gas-permeable, hydrophobic transport element, and an alkaline electrolyte or an alkaline electrolyte mixture, wherein one or more additional negative electrodes are provided with a respective gas-permeable, hydrophobic transport element, said transport elements being positioned to accommodate a flow of gas through said transport elements, and wherein all of the negative electrodes are hydrogen-storing negative electrodes, and wherein every second negative electrode is split into two parts, the two parts being separated from one another by a hydrophobic, gas-permeable transport element.

2. A gastight cell for the storage of electrochemical energy, comprising a plurality of positive nickel oxide electrodes and hydrogen-storing negative electrodes, a hydrophilic separator being arranged between the positive and negative electrodes, and an alkaline electrolyte or an alkaline electrolyte mixture, wherein the positive and negative electrodes are alternately arranged and one or more negative electrodes are provided with a gas-permeable, hydrophobic transport element for transporting the gases of the cell atmosphere, and all of the negative electrodes are hydrogen-storing negative electrodes, and wherein the negative electrodes comprise split electrodes and unsplit electrodes, the split electrodes comprising one or more negative electrodes that are split into two parts, the two parts being separated from one another by a hydrophobic, gas-permeable transport element, and wherein every second negative electrode is split into two parts.

3. The cell as claimed in claim 2, wherein the two parts of the split negative electrodes each have half the thickness or half the capacitance of one of the unsplit negative electrodes in the cell.

4. The cell as claimed in claim 2, wherein at least one transport element is a hydrophobic nonwoven layer.

5. The cell as claimed in claim 4, wherein the hydrophobic nonwoven layer comprises electrolyte-repelling polypropylene fibers.

6. The cell as claimed in claim 2, wherein the positive electrodes are fibrous-structure framework electrodes.

7. The cell as claimed in claim 2, wherein the separator comprises nonwoven polyamide fiber or hydrophilic nonwoven polypropylene fiber.

8. The cell as claimed in claim 2, wherein the negative electrodes comprise a metallic substrate material, to which an active compound is applied, the active compound being obtainable from a paste which comprises a dry fraction and a liquid fraction, the dry fraction comprising a mixture of a pulverulent storage alloy for hydrogen, soot and polytetrafluoroethylene (PTFE), and the liquid fraction comprising a mixture of water and an alcohol which has 3 to 6 C atoms.

9. The cell as claimed in claim 8, wherein the dry fraction comprising particles of the storage alloy being covered with polytetrafluoroethylene in the manner of fibrils.

10. The cell as claimed in claim 8, wherein the dry fraction comprises 85 to 95 parts of the alloy for storing hydrogen, 2 to 10 parts of soot and 3 to 8 parts of PTFE.

11. The cell as claimed in claim 8, wherein the liquid fraction contains 30 to 70 parts by volume of water and 70 to 30 parts by volume of the alcohol.

12. The cell as claimed in claim 8, wherein the dry fraction further comprises 0.2% by weight of polyethylene glycol.

13. The cell as claimed in claim 8, wherein the liquid fraction comprises polyethylene glycol.

14. The cell as claimed in claim 8, wherein the dry fraction and the liquid fraction has a mass ratio of 4:1 to 6:1.

15. A gastight cell for the storage of electrochemical energy, comprising at least one positive nickel oxide electrode and at least two hydrogen-storing negative electrodes, a hydrophilic separator being arranged between the positive and negative electrodes, and an alkaline electrolyte or an alkaline electrolyte mixture, wherein the two outmost electrodes are negative electrodes, which are each flanked by a respective gas-permeable, hydrophobic transport element said gas-permeable, hydrophobic transport elements comprising means for transporting gases away from said negative electrodes, wherein said means for transporting are each positioned to accommodate a flow of gas through said transport elements and wherein none of the electrodes are auxiliary electrodes and wherein every second negative electrode is split into two parts, the two parts being separated from one another by a hydrophobic, gas-permeable transport element.

16. A gastight cell for the storage of electrochemical energy, comprising:
   a plurality of electrodes consisting essentially of
      one or more positive nickel oxide electrodes, and
      two or more hydrogen-storing negative electrodes;
   a hydrophilic separator arranged between each of the positive and negative electrodes; and
   an alkaline electrolyte or an alkaline electrolyte mixture, wherein
   the two outmost electrodes are negative electrodes, which are each flanked by a respective gas-permeable, hydrophobic transport element for transporting the gases of the cell atmosphere, wherein said transport elements are positioned to accommodate a flow of gas through said transport elements and
   one or more inner negative electrodes are provided with a gas-permeable, hydrophobic transport element for transporting the gases of the cell atmosphere and wherein every second negative electrode is split into two parts, the two parts being separated from one another by a hydrophobic, gas-permeable transport element.

* * * * *